United States Patent
Pedersen

(10) Patent No.: US 10,752,147 B1
(45) Date of Patent: Aug. 25, 2020

(54) LOWERABLE AND RAISABLE VEHICLE TRAILER SYSTEM, AND METHOD OF OPERATING A VEHICLE TRAILER SYSTEM

(71) Applicant: James Oliver Pedersen, Deltona, FL (US)

(72) Inventor: James Oliver Pedersen, Deltona, FL (US)

(*) Notice: Subject to any disclaimer, the term of this patent is extended or adjusted under 35 U.S.C. 154(b) by 139 days.

(21) Appl. No.: 15/593,655

(22) Filed: May 12, 2017

Related U.S. Application Data

(60) Provisional application No. 62/336,193, filed on May 13, 2016.

(51) Int. Cl.
*B60P 1/18* (2006.01)
*B60P 1/16* (2006.01)
*B60P 1/43* (2006.01)

(52) U.S. Cl.
CPC .............. *B60P 1/18* (2013.01); *B60P 1/162* (2013.01); *B60P 1/43* (2013.01)

(58) Field of Classification Search
CPC ...................................... B60P 1/18; B60P 1/26
See application file for complete search history.

(56) References Cited

U.S. PATENT DOCUMENTS

| | | |
|---|---|---|
| 2,661,236 A | 12/1953 | Schonrock |
| 3,895,682 A | 7/1975 | Graham |
| 3,987,919 A * | 10/1976 | Weeks ............ B60P 1/08 414/471 |
| 4,003,583 A | 1/1977 | Stanzel |
| 4,109,811 A | 8/1978 | Stucky |
| 5,013,056 A * | 5/1991 | Landoll ............ B60P 1/18 280/149.2 |
| 5,026,228 A | 6/1991 | Mansfield |
| 6,010,154 A | 1/2000 | Payne et al. |
| 7,322,627 B1 | 1/2008 | Nicholson |
| 8,317,215 B2 | 11/2012 | Quenzi et al. |
| 8,651,510 B2 | 2/2014 | Fankhauser et al. |
| 8,690,127 B2 | 4/2014 | Patterman, Jr. et al. |

* cited by examiner

*Primary Examiner* — Saul Rodriguez
*Assistant Examiner* — Willie Berry, Jr.
(74) *Attorney, Agent, or Firm* — John Rizvi; John Rizvi, P.A.—"The Patent Professor"

(57) ABSTRACT

A selectively lowerable and raisable vehicle trailer system for raising and lowering of a vehicle trailer to expedite loading and unloading of cargo includes a rear wheel assembly. An elongated trailer is pivotally supported by the rear wheel assembly. The trailer is positional between a horizontal transport orientation and a sloped or angled loading/unloading orientation on the rear wheel assembly. The rear wheel assembly is selectively adjustable in position along the trailer between a rear transport position and a forward loading/unloading position, rearward and forward of the trailer center of gravity, respectively. A wheel assembly adjustment mechanism engages the rear wheel assembly. The wheel assembly adjustment mechanism operably engages the rear wheel assembly to facilitate selective positioning of the rear wheel assembly between the transport position and the loading/unloading position. A method of loading and unloading cargo onto and from a vehicle trailer is also disclosed.

15 Claims, 6 Drawing Sheets

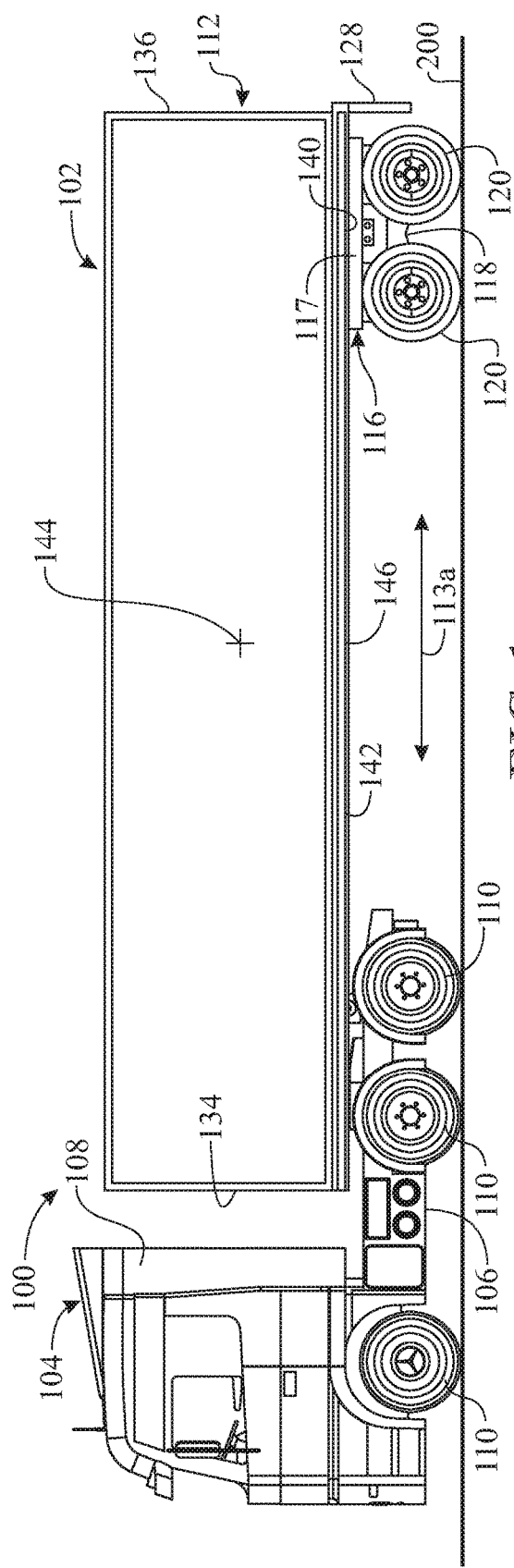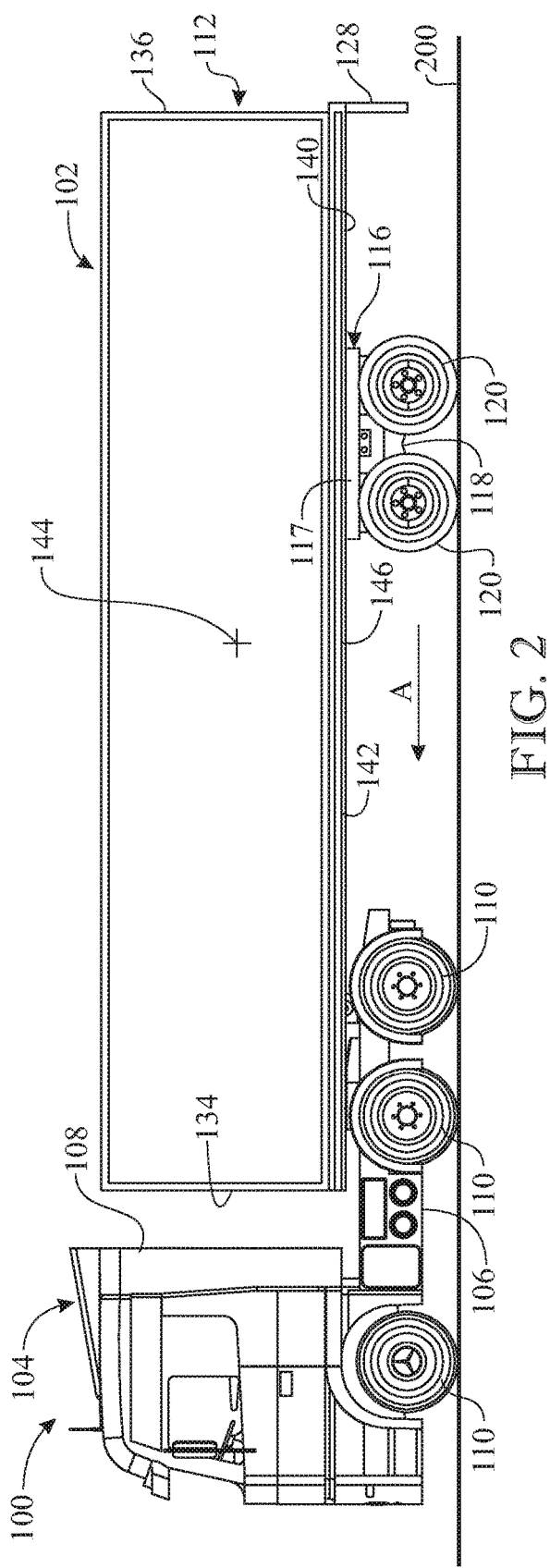

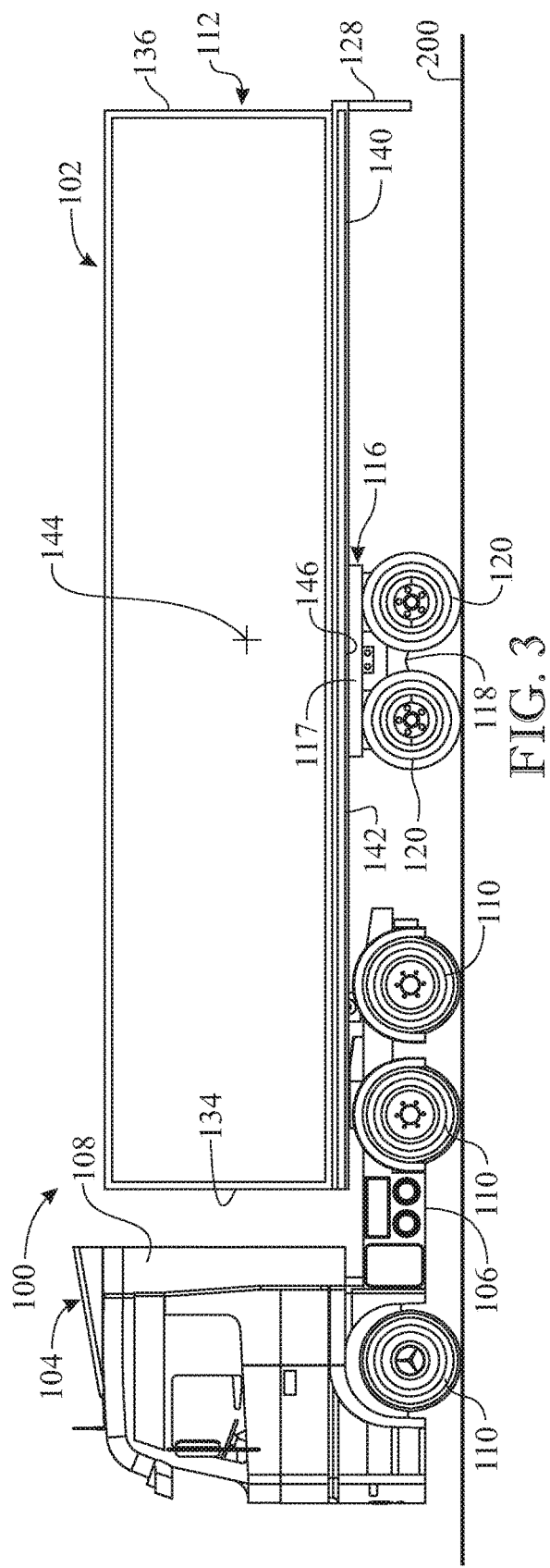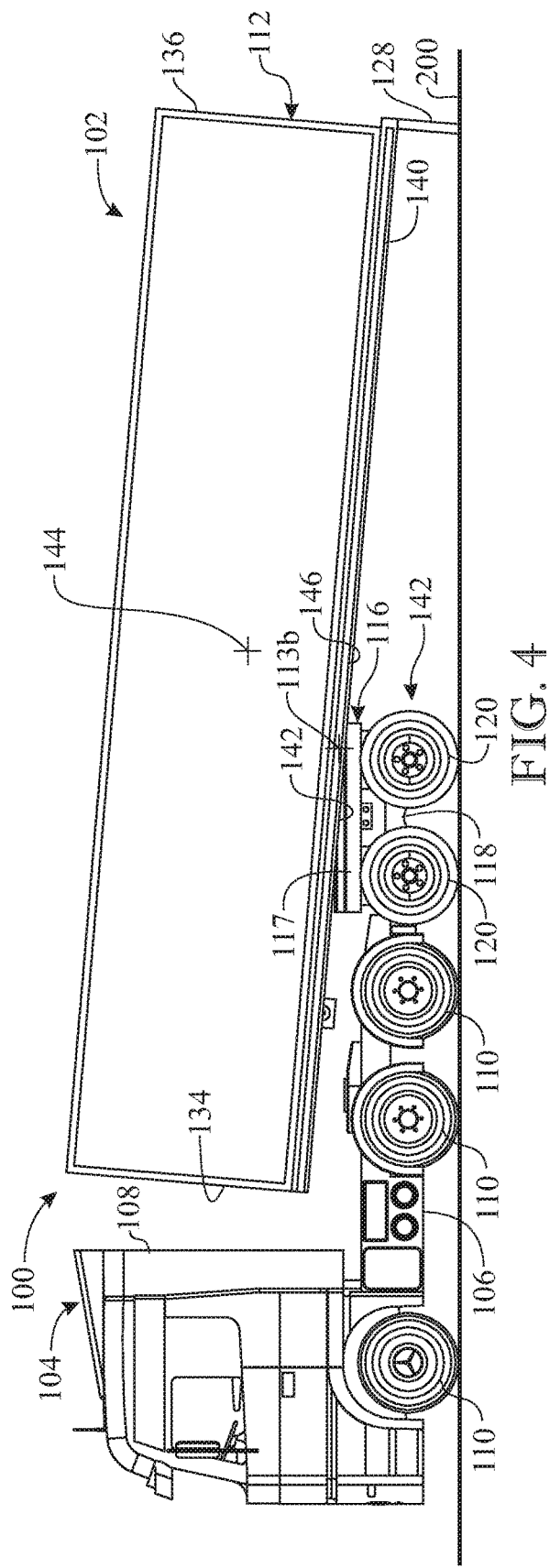

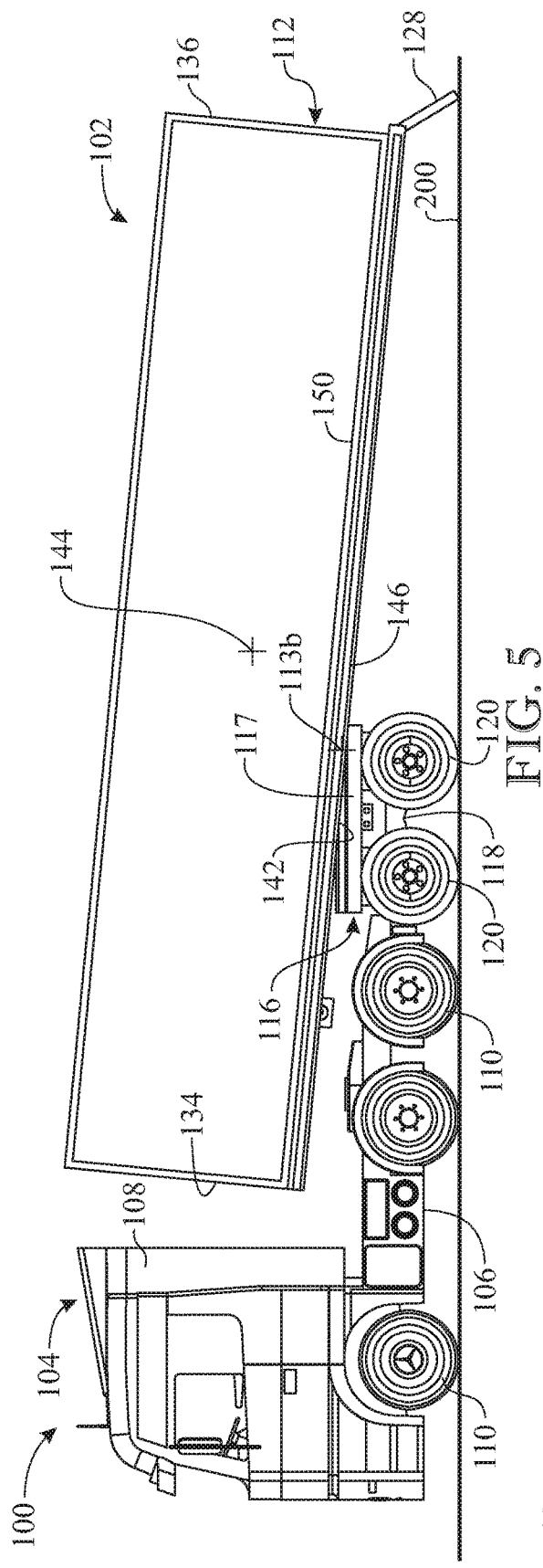
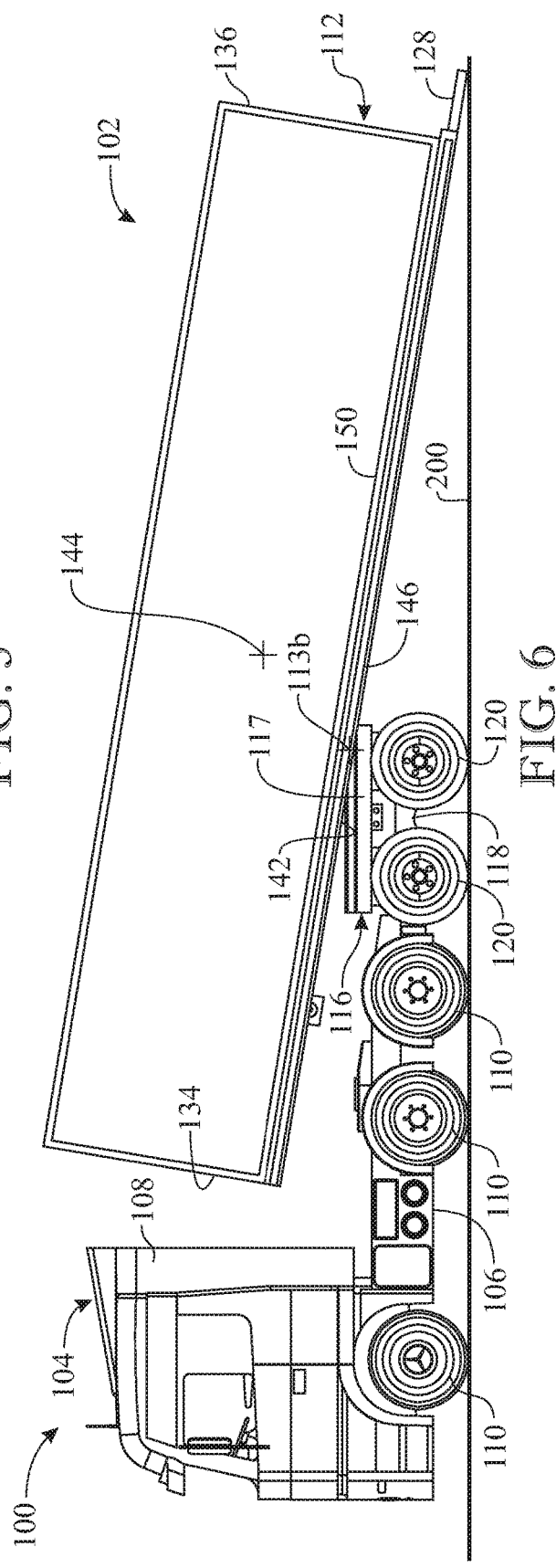
FIG. 5
FIG. 6

LOWERABLE AND RAISABLE VEHICLE TRAILER SYSTEM, AND METHOD OF OPERATING A VEHICLE TRAILER SYSTEM

CROSS-REFERENCE TO RELATED APPLICATIONS

This application claims the benefit of U.S. Provisional Patent Application Ser. No. 62/336,193, filed on May 13, 2016, which is incorporated by reference herein in its entirety.

FIELD OF THE INVENTION

The present invention relates generally to vehicle trailer systems, and more particularly, to a selectively lowerable and raisable vehicle trailer system and a method of operating a vehicle trailer system, which facilitate selective raising and lowering of a vehicle trailer to expedite loading and unloading of cargo.

BACKGROUND OF THE INVENTION

Semi-trailer trucks are frequently used to transport cargo of various kinds. A typical semi-trailer truck includes a tractor unit and an elongated, wheeled trailer which is articulately coupled to the tractor unit. The trailer typically includes a pair of rear doors which are opened to facilitate loading and unloading of cargo into and from, respectively, the interior of the trailer.

Cargo is typically loaded into the trailer of a semi-trailer truck at a manufacturing facility or a warehouse or other distribution facility and then transported to an unloading destination which may have one or more loading docks. Loading and unloading of heavy and/or large cargo is often particularly problematic when conventional loading and unloading methods and techniques are used. Loading of cargo into the trailer may be facilitated using a temporary ramp, one end of which is typically supported by the rear end of the trailer and the other end of which typically rests on the ground. The cargo must then be pushed, pulled or rolled up the ramp into the trailer. In some applications, an elevated platform or lifting equipment such as a forklift may be used to load cargo into the trailer.

In the event of lack of space or an insufficient number of loading docks at the unloading destination, truckers may be required to wait in line for unloading of the cargo, potentially retarding the progress of business. Moreover, delivery of cargo to its destination (e.g., a retail store or a fast food establishment) may require that the truck be parked in the parking lot of the establishment, a flimsy ramp be extended from the rear of the trailer and a dolly used to transport the cargo from the trailer, down the ramp and into the establishment. In some applications, a forklift may be used to unload the cargo from the trailer. In other applications, the cargo may be placed on a heavy rack which is rolled off the trailer using a lift gate. However, these techniques are attended by dangers such as the risk of the unloading personnel inadvertently falling off the trailer, ramp or lifting equipment or dropping and breaking the cargo. Moreover, the ramp may have a tendency to slip off of the trailer. The ramp may be sloped at a steep angle, necessitating that the loading and unloading personnel overcome the pull of gravity to transport the cargo up or down the ramp. Under circumstances in which the cargo is to be loaded or unloaded at a residence or remote location, for example, forklifts or other lifting equipment may not be available for the purpose.

Accordingly, there is an established need for an improved vehicle trailer system that solves at least one of the aforementioned problems, and facilitates safe and expedited loading and/or unloading of the cargo, particularly in small spaces.

SUMMARY OF THE INVENTION

The present invention is directed to a selectively lowerable and raisable vehicle trailer system, and to a method of operating the vehicle trailer system, which facilitate selective raising and lowering of a vehicle trailer to expedite loading and unloading of cargo. The vehicle trailer system may include a rear wheel assembly which is selectively adjustable in position along the length of the trailer between a rear, transport position and a forward, loading and unloading position. The center of gravity of the trailer typically lies between the transport position and the loading and unloading position. For transport of the cargo, the rear wheel assembly may be adjusted to the transport position on the trailer. In the loading and unloading of cargo into and from, respectively, the trailer, the rear wheel assembly may be adjusted from the transport position to the loading and unloading position on the trailer. Accordingly, the rear wheel assembly forwardly traverses the trailer until the rear wheel assembly typically advances past the center of gravity of the trailer. The trailer is pivoted rearwardly from a horizontal transport orientation to a sloped or angled loading/unloading orientation in which the rear end of the trailer rests on the ground, enabling personnel to load cargo into the trailer or unload the cargo from the trailer without having to lift the cargo or use a ramp for the purpose.

In a first implementation of the invention, a selectively lowerable and raisable vehicle trailer system, for raising and lowering a trailer to expedite loading and unloading of cargo into and from the trailer, comprises a rear wheel assembly and a trailer pivotally carried by the rear wheel assembly. A front-to-back, longitudinal position of the rear wheel assembly relative to the trailer is selectively adjustable. The trailer system is configured to selectively and reversibly adopt a transport configuration and a loading configuration. In the transport configuration, the rear wheel assembly is longitudinally adjusted to a first position, rearward of a center of gravity of the trailer, and the trailer is pivoted frontward relative to the rear wheel assembly and is arranged in a horizontal transport orientation. In the loading and unloading configuration, the rear wheel assembly is longitudinally adjusted to a second position, frontward of the center of gravity of the trailer, and the trailer is pivoted rearward relative to the rear wheel assembly and is arranged in a rearward sloped orientation, facilitating loading and unloading the trailer.

In a second aspect, the rear wheel assembly can include a rear wheel assembly frame which is configured for adjustment in position along the trailer.

In another aspect, the rear wheel assembly can include at least one pair of tandem rear wheels rotatably carried by the rear wheel assembly frame.

In another aspect, the vehicle trailer system can further include at least one track rail affixed to the trailer. The rear wheel assembly can be mounted on the at least one track rail for front-to-back, longitudinal displacement along the at least one track rail.

In another aspect, the at least one track rail can be affixed to a bottom wall of the trailer.

In another aspect, the rear wheel assembly can include a rear wheel assembly frame.

In yet another aspect, the rear wheel assembly can include an assembly frame bracket.

In another aspect, the assembly frame bracket can be configured for adjustment in position along the at least one track rail, and the rear wheel assembly frame can be pivotably mounted on the assembly frame bracket. The rear wheel assembly can further include at least one wheel rotatably carried by the rear wheel assembly frame.

In another aspect, the vehicle trailer system can further include a wheel assembly adjustment mechanism operably engaging the rear wheel assembly to facilitate selective positioning of the rear wheel assembly between the first position and the second position.

In another aspect, the wheel assembly adjustment mechanism can include a winch.

In another aspect, the winch can be affixed to a bottom wall of the trailer.

In another aspect, the vehicle trailer system can further include at least one winch cable engaging the rear wheel assembly and the winch. The at least one winch cable can be operable by the winch to move the rear wheel assembly.

In another aspect, the rear wheel assembly can include at least one wheel rotatably carried by the rear wheel assembly frame, and the at least one winch cable can engage the rear wheel assembly frame.

In another aspect, the assembly frame bracket can be configured for adjustment in position along the at least one track rail, and the rear wheel assembly frame can be pivotably mounted on the assembly frame bracket. The rear wheel assembly can include at least one wheel rotatably carried by the rear wheel assembly frame. The at least one winch cable can engage the rear wheel assembly frame.

In another aspect, the vehicle trailer system can further comprise a rear lift at a rear end of the trailer. The rear lift can be operated to selectively align with a floor of the trailer for loading and unloading of cargo to and from the trailer.

In another aspect, the rear wheel assembly can be locked to prevent longitudinal movement of the rear wheel assembly relative to the trailer.

In another aspect, the rear wheel assembly can further include a tractor unit coupled to the trailer. The tractor unit can include a cab.

In a second implementation of the invention, a selectively lowerable and raisable vehicle trailer system includes a rear wheel assembly, a trailer pivotally carried by the rear wheel assembly, and a winch. A front-to-back, longitudinal position of the rear wheel assembly relative to the trailer is selectively adjustable by operating the winch. The trailer system is configured to selectively and reversibly adopt, by operating the winch, a transport configuration and a loading and unloading configuration as described heretofore.

In a second aspect, the winch can be carried by the trailer.

In another aspect, the winch can be arranged beneath the trailer.

In another implementation of the invention, a method of loading and unloading cargo to and from a vehicle trailer, includes a step of obtaining vehicle trailer system, the vehicle trailer system comprising a rear wheel assembly and a trailer pivotally carried by the rear wheel assembly, wherein a front-to-back, longitudinal position of the rear wheel assembly relative to the trailer is selectively adjustable. The vehicle trailer system is initially adjusted to a transport configuration in which the rear wheel assembly is longitudinally adjusted to a first position, rearward of a center of gravity of the trailer, and further in which the trailer is pivoted frontward relative to the rear wheel assembly and is arranged in a horizontal transport orientation. In order to load or unload the trailer, the longitudinal position of the rear wheel assembly is then adjusted from the transport configuration to a loading and unloading configuration in which the rear wheel assembly is longitudinally adjusted to a second position, frontward of the center of gravity of the trailer, and further in which the trailer is pivoted rearward relative to the rear wheel assembly and is arranged in a rearward sloped orientation. The vehicle trailer system ca be selectively and reversibly switched to between the transport configuration and the loading and unloading configuration.

In another implementation of the invention, a method of loading and unloading cargo to and from a vehicle trailer comprises the steps of:

activating a main air brake of the vehicle;

releasing a locking system on a rear wheel base of a rear wheel assembly on the trailer;

activating a wheel assembly adjustment mechanism to move the rear wheel assembly from a transport position to a loading/unloading position on the trailer; and activating a pneumatic/hydraulic lift to lower the trailer from a horizontal transport orientation to a sloped or angled loading/unloading orientation.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 1 presents a side elevation view of the vehicle trailer system of the present invention with the rear wheel assembly in a rear, transport position and the trailer deployed in a horizontal transport orientation;

FIG. 2 presents a side elevation view of the vehicle trailer system of the present invention with the rear wheel assembly in transit from the transport position to a forward loading/unloading position;

FIG. 3 presents a side elevation view of the vehicle trailer system of the present invention with the rear wheel assembly at the trailer center of gravity as it transitions from the transport position to the loading/unloading position;

FIG. 4 presents a side elevation view of the vehicle trailer system of the present invention with the rear wheel assembly at the loading/unloading position, the trailer having been deployed from the horizontal transport orientation to the sloped or angled loading/unloading orientation and the rear lift shown deployed in the stowed position;

FIG. 5 presents a side elevation view of the vehicle trailer system of the present invention with the rear wheel assembly at the loading/unloading position, the trailer deployed to the sloped or angled loading/unloading orientation and the rear lift in transit between the stowed position and the extended position;

FIG. 6 presents a side elevation view of the vehicle trailer system of the present invention with the rear wheel assembly at the loading/unloading position, the trailer deployed in the sloped or angled loading/unloading orientation and the rear lift deployed in the extended position for loading and unloading of cargo to and from the trailer;

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a selectively lowerable and raisable vehicle trailer system and to a method of operating a vehicle trailer system. The system and method facilitate selective raising and lowering of a vehicle trailer to expedite loading and unloading of cargo in a manner which is safe for the cargo, the vehicle, the trailer system and the operator. The system and method of the present invention can be implemented in a wide variety of vehicles and trailers; for instance and without limitation, the system and method of the present invention can be implemented in a dry van, a refrigerated trailer, a drop deck van, a drop deck flat bed, a flat bed, and a utility trailer.

Figure 7:
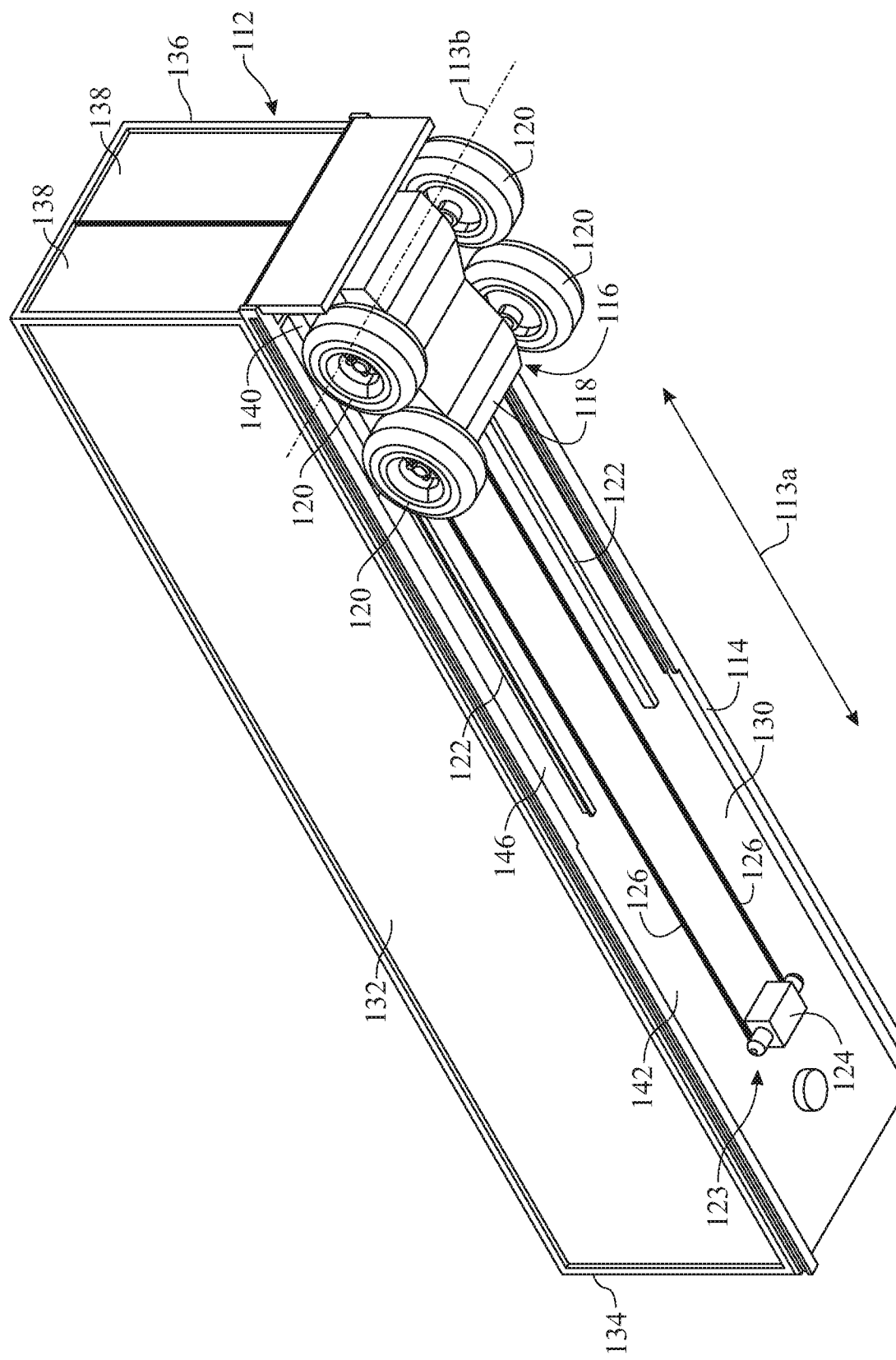
FIG. 7 presents a bottom rear perspective view of the vehicle trailer system of the present invention with the rear wheel assembly at the transport position.

Referring initially to FIGS. 1-8, a lowerable and raisable vehicle trailer system 100 is illustrated in accordance with an exemplary embodiment of the present invention. By way of example, the vehicle trailer system 100 is shown implemented on an exemplary semi-trailer truck 102. As mentioned heretofore, in other embodiments, the vehicle trailer system 100 may be implemented on a flatbed trailer truck or other type of truck known by those skilled in the art. Unless otherwise noted, the semi-trailer truck 102 may have a conventional design known by those skilled in the art. Accordingly, the semi-trailer truck 102 may include a tractor unit 104 having a tractor unit frame 106. The tractor unit 104 further includes a cab 108 with cab wheels 110 which can be attached to, carried by or mounted on the tractor unit frame 106. A trailer 112 may be detachably coupled to the cab 108 for towing, typically in the conventional manner. As illustrated in FIG. 7, the trailer 112 may include a trailer frame 114. A bottom trailer wall 130 and a pair of side trailer walls 132 can be provided on the trailer frame 114. The trailer 112 can also include a top wall or roof (not numbered) extending between the side trailer walls 132. The trailer 112 may have a front trailer end 134 proximate the tractor unit 104 and a rear trailer end 136. A pair of trailer doors 138 may be provided at the rear trailer end 136 to allow or prevent access to an interior of the trailer 112. The tractor unit 104 may include a main air brake (not illustrated) which can be selectively deployed to prevent inadvertent movement of the semi-trailer truck 102 in a parked position, as is known by those skilled in the art.

As shown for instance in FIGS. 1 and 6, a rear wheel assembly 116 is mounted on an underside of the trailer 112. In some embodiments, the rear wheel assembly 116 may include a rear wheel assembly frame 118. At least one pair of rear wheels 120 may be mounted on the rear wheel assembly frame 118. In some embodiments, the rear wheels 120 may include two pairs of tandem wheels, as illustrated.

Figure 8:
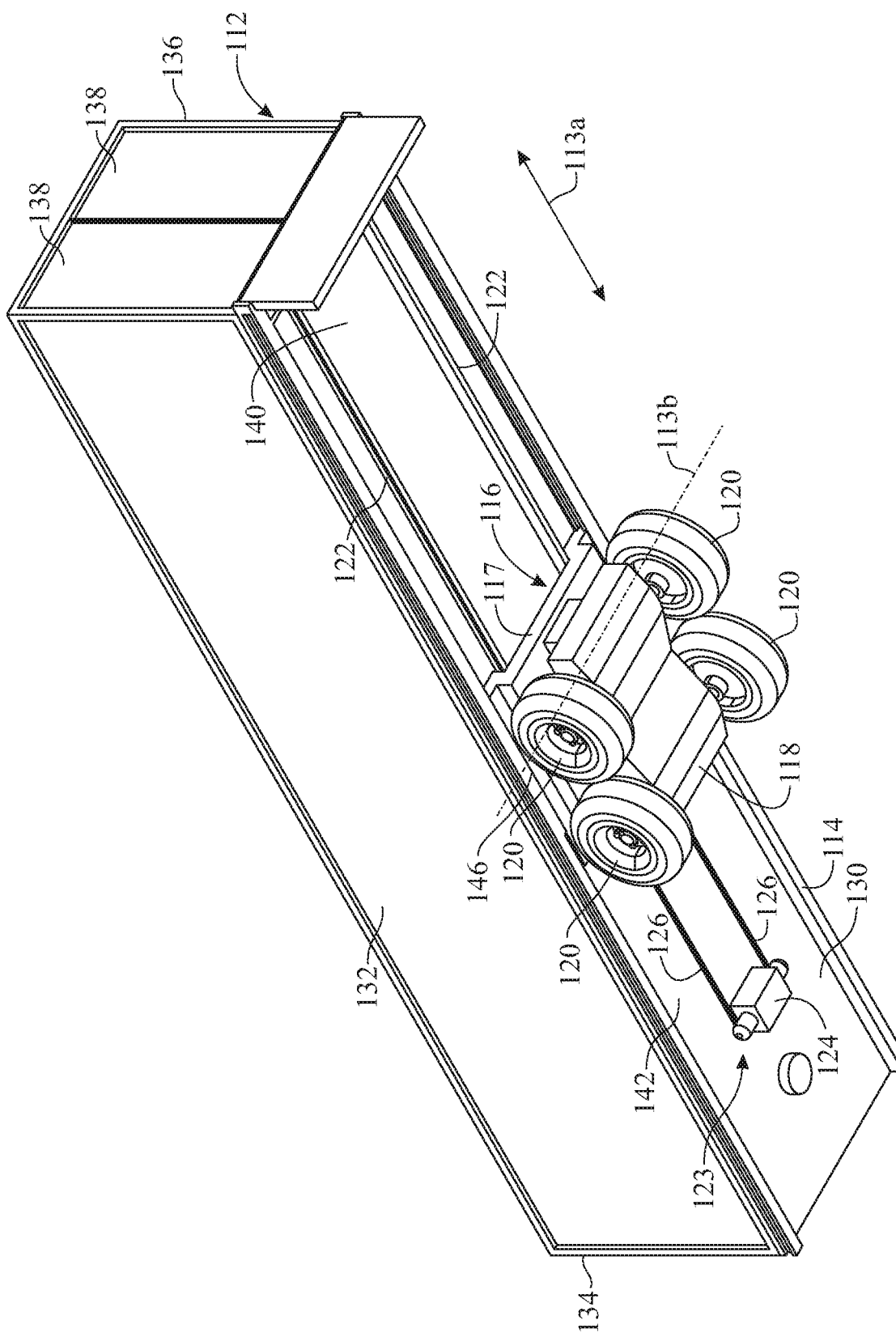
FIG. 8 presents a bottom rear perspective view of the vehicle trailer system of the present invention with the rear wheel assembly at the trailer center of gravity as it transitions from the transport position to the loading/unloading position.

The rear wheel assembly 116 is slidable relative to the trailer 112 in a front-to-back, longitudinal direction 113*a*, and is pivotable relative to the trailer 112 about a side-to-side, transverse rotation axis 113*b* which is perpendicular to the longitudinal direction 113*a*. The position of the rear wheel assembly 116 along the front-to-back, longitudinal direction 113*a* is adjustable responsively to user operation of the vehicle trailer system 100, as will be described in greater detail hereinafter. As illustrated in FIGS. 7 and 8, in some embodiments, at least one elongated track rail 122 may be provided on the bottom trailer wall 130 of the trailer 112. In some embodiments, a pair of elongated, parallel, spaced-apart track rails 122 may be provided on the bottom trailer wall 130, as illustrated. The track rails 122 may be oriented generally parallel to the front-to-back, longitudinal direction 113*a*. As illustrated in FIG. 8, the rear wheel assembly frame 118 may be mounted on an assembly frame bracket 117. The assembly frame bracket 117 may engage the track rails 122 in longitudinal, front-to-back sliding relation thereto for selective positioning of the rear wheel assembly 116 from a rear, transport position 140 (FIG. 1) to a forward, loading/unloading position 142 (FIG. 4), and along intermediate positions (not numbered) arranged between the transport position 140 and the loading/unloading position 142. The trailer center of gravity 144 has been illustrated for purposes that will be described in detail hereinafter. The rear wheel assembly 116 is pivotable relative to the trailer 112, for instance by having the assembly frame bracket 117 pivotably coupled to the trailer 112 (as shown in the drawings) or by having the rear wheel assembly frame 118 pivotably coupled to the assembly frame bracket 117 (not shown). A locking system such as but not limited to, a transverse bolt (not illustrated) may operably engage the rear wheel assembly 116 to selectively prevent inadvertent travel of the rear wheel assembly 116 on the track rails 122 during transport, loading and unloading of the cargo.

As further illustrated in FIGS. 7 and 8, in some embodiments, a wheel assembly adjustment mechanism 123 may operably engage the rear wheel assembly 116 to cause the rear wheel assembly 116 to move between the transport position 140 and the loading/unloading position 142. In some embodiments, the wheel assembly adjustment mechanism 123 may include a winch 124 which may be mounted on the bottom trailer wall 130. The winch 124 may operably engage at least one, and more preferably, a pair of winch cables 126 for symmetrical distribution of forces to the rear wheel assembly 116. The winch cables 126 may be attached to the rear wheel assembly frame 118 of the rear wheel assembly 116 according to the knowledge of those skilled in the art. Accordingly, responsive to selective operation of the winch 124, the winch cables 126 may deploy the rear wheel assembly 116 on the track rails 122 between the transport position 140 and the loading/unloading position 142 for purposes which will be hereinafter described. The winch 124 may be operated manually, pneumatically, electrically, hydraulically, or using any other applicable mechanism responsive to user-operated controls. In other embodiments, the rear wheel assembly 116 may be configured for manual movement between the transport position 140 and the loading/unloading position 142.

A ramp, panel or other rear lift 128 may be pivotally, slidably or otherwise mounted on the trailer frame 114 at the rear trailer end 136 of the trailer 112. A ramp actuating mechanism (not illustrated), such as a hydraulic, electric or pneumatic piston, for example and without limitation, may operably engage the rear lift 128, according to the knowledge of those skilled in the art, to facilitate selective deployment of the rear lift 128 between a stowed position illustrated in FIGS. 1-4 in which the rear lift 128 is not aligned with a floor 150 of the trailer 112, and an extended position illustrated in FIG. 6 in which the rear lift 128 is substantially aligned with a floor 150 of the trailer 112 to facilitate loading and unloading of cargo into and from the trailer 112.

The illustrations of FIGS. 1-6 show a sequence of operation of the vehicle trailer system 100, in a typical cargo loading/unloading application of the invention. In this typical application of the vehicle trailer system 100, the trailer 112 is deployed from an initial, horizontal transport position illustrated in FIG. 1 to an angled or sloped loading/unloading position illustrated in FIG. 6 to facilitate loading of cargo (not illustrated) into the trailer 112 or unloading of cargo from the trailer 112.

In the initial position of FIG. 1, the trailer 112 is arranged generally horizontally and the rear wheel assembly 116 is located at the rear, transport position 140. In addition, the rear lift 128 is folded downward and is in the air, i.e. at a distance from the ground 200. As shown, the center of gravity 144 of the trailer 112 is located so that a horizontal projection 146 of the center of gravity 144 is arranged between the rear, transport position 140 and the front, loading/unloading position 142. In other words, the center of gravity 144 is located longitudinally between the transport position 140 and the loading/unloading position 142. The exact longitudinal position of the center of gravity 144 (i.e. the position of the horizontal protection 146) and the height of the center of gravity 144 may vary, for instance depending on whether the trailer 112 is unloaded or loaded. When loading the trailer 112, the load (not shown) can be positioned in such a way that the center of gravity 144 of the trailer 112 and load continues to be arranged so that its horizontal projection 146 is arranged between the transport position 140 and the loading/unloading position 142.

Starting from the initial position of FIG. 1, the main air brake (not illustrated) on the tractor unit 104 of the semi-trailer truck 102 may be activated to immobilize the semi-trailer truck 102. The semi-trailer truck 102 may then be operated, for instance and without limitation, to accumulate air pressure for a pneumatic system powering the winch 124. The locking system (not illustrated) on the rear wheel assembly 116 may then be released to facilitate travel of the rear wheel assembly 116 along the track rails 122. Next, the winch 124 of the wheel assembly adjustment mechanism 123 may be operated to start advancing the rear wheel assembly 116 on the track rails 122 from the rear, transport position 140 forward, as shown in FIG. 2 and indicated by arrow A. Continued operation of the winch 124 causes the rear wheel assembly 116 to eventually reach the horizontal projection 146 of the center of gravity 144 of the trailer 112 as illustrated in FIG. 3. From his point, continued operation of the winch 124 causes the rear wheel assembly 116 to overcome the horizontal projection 146 of the center of gravity 144, and the trailer 112 to pivot downward while the rear wheel assembly 116 continues moving forward. Eventually, the downward pivoting of the trailer 112 causes the rear lift 128 to contact the ground 200.

The illustration of FIG. 4 shows the vehicle trailer system 100 in a position in which the rear lift 128 is contacting on the ground 200 and the rear wheel assembly 116 has reached the loading/unloading position 142. Upon positioning of the rear wheel assembly 116 at the front, loading/unloading position 142, the rear lift 128 is operated to complete deployment of the trailer 112 in the loading/unloading orientation. More specifically, the ramp actuating mechanism (not illustrated) is operated to deploy the rear lift 128 as shown in FIGS. 5 and 6, to reach a position in which the rear lift 128 is extended and substantially aligned with the floor 150 on the inside of the trailer 112, to facilitate loading/unloading of cargo into/from the trailer 112. Once the situation of FIG. 6 is achieved, cargo (not illustrated) may then be loaded or unloaded into or from the trailer 112 via the rear lift 128.

After loading/unloading of the cargo into/from the trailer 112 is completed, the pneumatic/hydraulic lift may be operated to return the trailer 112 from the angled or sloped loading/unloading orientation back to the horizontal transport orientation. The winch 124 of the wheel assembly adjustment mechanism 123 may again be operated to return the rear wheel assembly 116 from the front, loading/unloading position 142 back to the rear, transport position 140. The ramp actuating mechanism (not illustrated) may be operated to return the rear lift 128 from the extended position (FIG. 6) to the stowed position (FIG. 1). The semi-trailer truck 102 may then be driven to another destination for unloading/loading cargo.

It will be appreciated by those skilled in the art that the vehicle trailer system 100 can be retrofitted to an existing semi-trailer truck 102 or fabricated in place as the semi-trailer truck 102 is manufactured. The vehicle trailer system 100 renders the loading and unloading of trailers safe, expeditious and efficient. The vehicle trailer system 100 enables the rear trailer end 136 to be lowered to the ground, rendering ease in loading and unloading the trailer 112, particularly in areas of limited space. The vehicle trailer system 100 is cost-effective, and thus accessible to both large and small businesses. The various controls for operation of the vehicle trailer system 100, including the winch 124, the pneumatic/hydraulic lift, the rear lift 128, the locking system and the main air brake, may be provided in the tractor unit 104 or in any other suitable accessible location.

Figure 9:
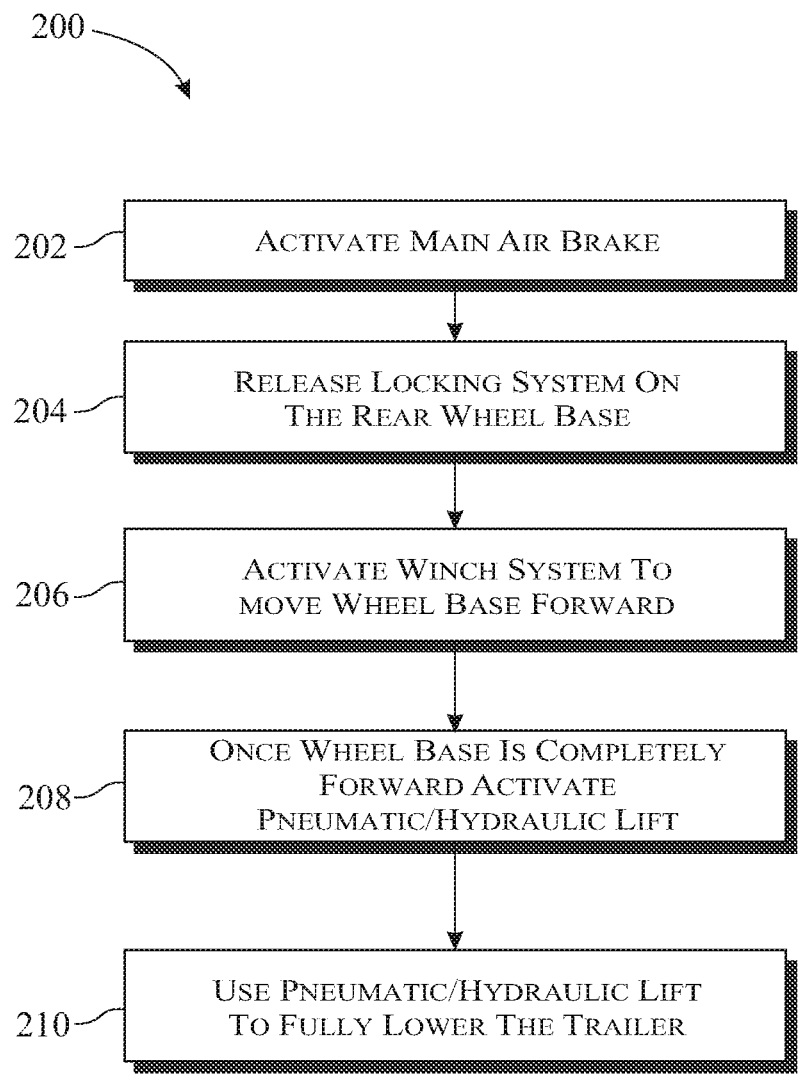
FIG. 9 presents a flow diagram of an exemplary method of loading and unloading cargo to and from a vehicle trailer in accordance with the invention.

Referring next to FIG. 9, a flow diagram 200 of a method of loading and unloading cargo onto and from a trailer on a vehicle, such as but not limited to a semi-trailer truck, is illustrated. The vehicle may include a tractor unit, an elongated trailer which is coupled to the tractor unit and a rear wheel assembly which is slidable relative to the trailer in a front-to-back, longitudinal direction, and pivotable relative to the trailer about a side-to-side, transverse rotation axis. The rear wheel assembly is selectively adjustable in position along the trailer between a rear transport position and a forward loading/unloading position typically across a center of gravity of the trailer. At step 202, a main air brake on the tractor unit may be activated to prevent inadvertent movement of the vehicle. At step 204, a locking system on a rear wheel base of the rear wheel assembly may be released. At step 206, a winch system or other wheel assembly adjustment mechanism may be activated to move the wheel base of the rear wheel assembly forward from the rear transport position, typically across the trailer center of gravity to the forward loading/unloading position on the trailer allowing the trailer to pivot rearward in relation to the rear wheel assembly. At step 208, a rear lift (which can be, for instance, pneumatically- or hydraulically-powered) may be deployed from a stowed position to an extended position, allowing the trailer to fully lower and cargo to be loaded or unloaded into or from the trailer via the rear lift. In subsequent steps, the trailer may be returned from the loading/unloading orientation to the transport orientation, the rear wheel assembly may be returned from the loading/unloading position back to the transport position and the rear lift may be returned from the extended position back to the stowed position for transport of the vehicle.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A selectively lowerable and raisable vehicle trailer system for raising and lowering a trailer to expedite loading and unloading of cargo into and from the trailer, the vehicle trailer system comprising:
   a rear wheel assembly comprising an assembly frame bracket, a rear wheel assembly frame pivotably mounted on the assembly frame bracket, and at least one wheel rotatably carried by the rear wheel assembly frame, the at least one wheel having a locking brake independent from a main air brake of a tractor unit attached to the trailer;
   a trailer pivotally carried by the rear wheel assembly, the trailer including a rear lift with an extended position substantially aligned with a floor of the trailer; and wherein at least one track rail affixed to the trailer, wherein the assembly frame bracket of the rear wheel assembly engages the at least one track rail and is configured for adjustment in position along the at least one track rail for front-to-back, longitudinal displacement of the rear wheel assembly along the at least one track rail; wherein
   a front-to-back, longitudinal position of the rear wheel assembly relative to the trailer is selectively adjustable; and further wherein
the trailer system is configured to selectively and reversibly adopt:
   a transport configuration in which the rear wheel assembly is longitudinally adjusted to a first position while the main air brake is engaged and the locking brake is disengaged, rearward of a center of gravity of the trailer, and further in which the trailer is pivoted frontward relative to the rear wheel assembly and is arranged in a horizontal transport orientation, and
   a loading and unloading configuration in which the rear wheel assembly is longitudinally adjusted to a second position while the main air brake is engaged and the locking brake is disengaged while the wheels of the rear wheel assembly are on a round surface, frontward of the center of gravity of the trailer, and further in which the trailer is pivoted rearward relative to the rear wheel assembly and is arranged in a rearward sloped orientation causing the rear lift to touch the ground surface while the rear lift is in a stowed position.

2. The vehicle trailer system of claim 1, wherein the rear wheel assembly comprises a rear wheel assembly frame which is configured for adjustment in position along the trailer.

3. The vehicle trailer system of claim 2, wherein the rear wheel assembly comprises at least one pair of tandem rear wheels rotatably carried by the rear wheel assembly frame.

4. The vehicle trailer system of claim 1, wherein the at least one track rail is affixed to a bottom wall of the trailer.

5. The vehicle trailer system of claim 1, further comprising a wheel assembly adjustment mechanism operably engaging the rear wheel assembly to facilitate selective positioning of the rear wheel assembly between the first position and the second position.

6. The vehicle trailer system of claim 5, wherein the wheel assembly adjustment mechanism comprises a winch.

7. The vehicle trailer system of claim 6, wherein the winch is affixed to a bottom wall of the trailer.

8. The vehicle trailer system of claim 6, further comprising at least one winch cable engaging the rear wheel assembly and the winch, wherein the at least one winch cable is operable by the winch to move the rear wheel assembly.

9. The vehicle trailer system of claim 8, wherein the at least one winch cable engages the rear wheel assembly frame.

10. The vehicle trailer system of claim 1, wherein the rear lift is operable to selectively align with a floor of the trailer for loading and unloading of cargo to and from the trailer.

11. The vehicle trailer system of claim 1, wherein the tractor unit comprises a cab.

12. A selectively lowerable and raisable vehicle trailer system for raising and lowering a trailer to expedite loading and unloading of cargo into and from the trailer, the vehicle trailer system comprising:
   a rear wheel assembly, comprising an assemble frame bracket, a rear wheel assembly frame pivotably mounted on the assembly frame bracket, and at least one wheel rotatably carried by the rear wheel assembly frame, the at least one wheel having a locking brake independent from a main air brake of a tractor unit attached to the trailer;
   a trailer pivotally carried by the rear wheel assembly, the trailer including a rear lift with an extended position substantially aligned with a floor of the trailer;
   at least one track rail affixed to the trailer, wherein the assembly frame bracket of the rear wheel assembly engages the at least one track rail and is configured for adjustment in position along the at least one track rail for front-to-back, longitudinal displacement of the rear wheel assembly along the at least one track rail;
   a winch; and
   at least one winch cable engaging the rear wheel assembly frame and the winch, wherein the at least one winch cable is operable by the winch to move the rear wheel assembly; wherein
   a front-to-back, longitudinal position of the rear wheel assembly relative to the trailer is selectively adjustable by operating the winch; and further wherein the trailer system is configured to selectively and reversibly adopt:

a transport configuration in which the rear wheel assembly is longitudinally adjusted to a first position, rearward of a center of gravity of the trailer, and further in which the trailer is pivoted frontward relative to the rear wheel assembly and is arranged in a horizontal transport orientation while the main air brake is engaged and the locking brake is disengaged, and a loading and unloading configuration in which the rear wheel assembly is longitudinally adjusted to a second position while the main air brake is engaged and the locking brake is disengaged while the wheels of the rear wheel assembly are on a ground surface, frontward of the center of gravity of the trailer, and further in which the trailer is pivoted rearward relative to the rear wheel assembly and is arranged in a rearward sloped orientation causing the rear lift to touch the ground surface while the rear lift is in a stowed position.

13. The vehicle trailer system of claim 12, wherein the winch is carried by the trailer.

14. The vehicle trailer system of claim 13, wherein the winch is arranged beneath the trailer.

15. A method of loading and unloading cargo to and from a vehicle trailer, comprising the steps of:

obtaining vehicle trailer system, the vehicle trailer system comprising a rear wheel assembly and a trailer pivotally carried by the rear wheel assembly, wherein the rear wheel assembly comprises an assembly frame bracket, a rear wheel assembly frame pivotably mounted on the assembly frame bracket, and at least one wheel rotatably carried by the rear wheel assembly frame, and further wherein a front-to-back, longitudinal position of the rear wheel assembly relative to the trailer is selectively adjustable, the vehicle trailer system further comprising at least one track rail affixed to the trailer, wherein the assembly frame bracket of the rear wheel assembly engages the at least one track rail and is configured for adjustment in position along the at least one track rail for front-to-back, longitudinal displacement of the rear wheel assembly along the at least one track rail, the at least one wheel having a locking brake independent from a main air brake of a tractor unit attached to the vehicle trailer and, the vehicle trailer including a rear lift with an extended position substantially aligned with a floor of the vehicle trailer;

adjusting the longitudinal position of the rear wheel assembly from a transport configuration in which the rear wheel assembly is longitudinally adjusted to a first position while the main air brake is engaged and the locking brake is disengaged, rearward of a center of gravity of the trailer, and further in which the trailer is pivoted frontward relative to the rear wheel assembly and is arranged in a horizontal transport orientation, to a loading and unloading configuration in which the rear wheel assembly is longitudinally adjusted to a second position while the main air brake is engaged and the locking brake is disengaged while the wheels of the rear wheel assembly are on a ground surface, frontward of the center of gravity of the trailer, and further in which the trailer is pivoted rearward relative to the rear wheel assembly and is arranged in a rearward sloped orientation causing the rear lift to touch the ground surface while the rear lift is in a stowed position.

* * * * *